Dec. 15, 1925.

D. P. OWENS 1,566,226

DUAL WHEEL

Original Filed July 19, 1924  2 Sheets-Sheet 1

Dabney P. Owens
INVENTOR

BY Victor J. Evans
ATTORNEY

WITNESS:

Dec. 15, 1925.                      1,566,226
D. P. OWENS
DUAL WHEEL
Original Filed July 19. 1924    2 Sheets-Sheet 2

Dabney P. Owens
INVENTOR

BY Victor J. Evans
ATTORNEY

WITNESS:

Patented Dec. 15, 1925.

1,566,226

UNITED STATES PATENT OFFICE.

DABNEY P. OWENS, OF LAKE WORTH, FLORIDA.

DUAL WHEEL.

Application filed July 19, 1924, Serial No. 727,061. Renewed November 9, 1925.

*To all whom it may concern:*

Be it known that I, DABNEY P. OWENS, a citizen of the United States, residing at Lake Worth, in the county of Palm Beach and State of Florida, have invented new and useful Improvements in Dual Wheels, of which the following is a specification.

This invention relates to a dual wheel for motor vehicles and the like, the general object of the invention being to provide an auxiliary wheel arranged adjacent a main wheel with means for placing the auxiliary wheel in alignment with the main wheel when additional traction is desired, such means permitting the auxiliary wheel to be normally held in position where it will not engage the road surface.

Another object of the invention is to provide means for locking the two wheels together when the auxiliary wheel has been moved into road engaging position.

A further object of the invention is to associate an endless track with the auxiliary wheel.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
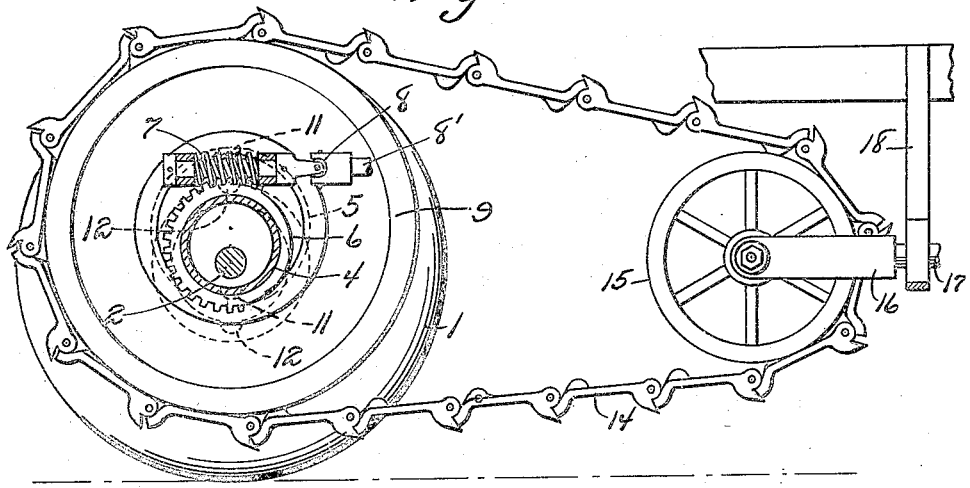
Figure 1 is a view showing the auxiliary wheel in raised position.
Figure 2:
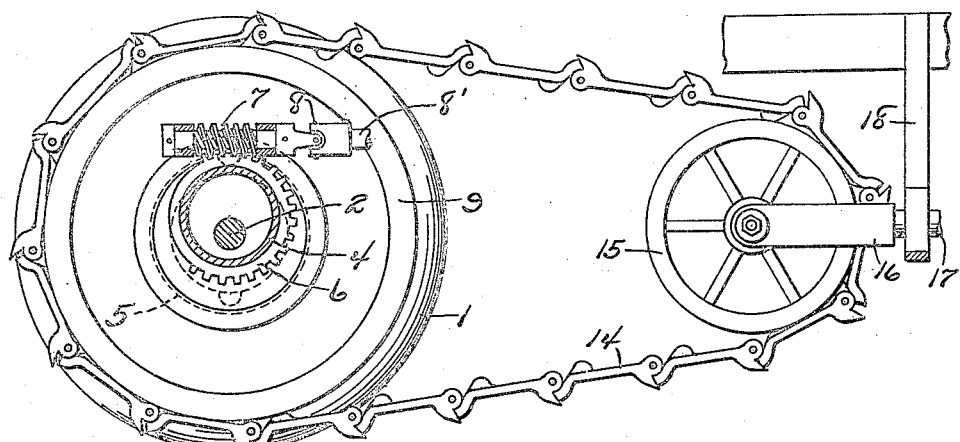
Figure 2 is a similar view but showing the auxiliary wheel in lowered position.
Figure 7:
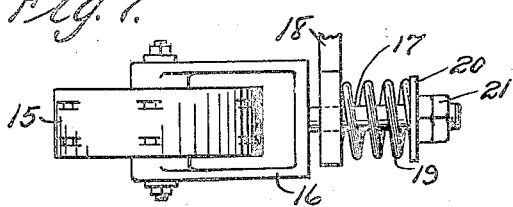
Figure 7 is a detail plan view of the idler wheel and its supporting means for the endless track.

In these views, 1 indicates the main wheel of the tractor or other vehicle which is connected in the usual or any desired manner to the axle 2. A stationary tubular shaft or housing 3 encloses the axle and has an eccentric part 4 thereon which is engaged by an eccentric strap 5 which has a worm gear 6 secured to its extension, said gear meshing with a worm 7 rotatably mounted in a part fastened to the vehicle and which is rotated by the operator through suitable connections which include a flexible joint 8. Thus the strap can be rotated by the operator of the vehicle by turning a suitable handle on the connecting shaft 8' which is connected with the worm by the joint 8. The auxiliary wheel is shown at 9 and said wheel has its hub portion 10 engaging the strap 5 so that the movement of the strap will act to move the wheel 9 bodily in a vertical direction so as to bring it into alignment with the main wheel, as shown in Figure 2, or out of alignment therewith, as shown in Figure 1. Lugs 11 are formed on the hub part of the auxiliary wheel and are adapted to engage notches 12 formed in a part of the main wheel when the wheels are in alignment with each other so that the auxiliary wheel will be locked to the main wheel and will thus be caused to revolve with said main wheel, the auxiliary wheel 9 revolving on the eccentric strap 5.

Figure 3:
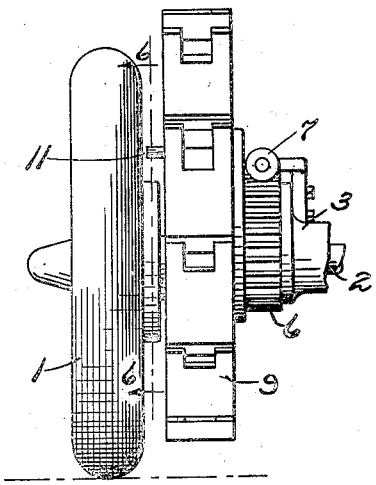
Figure 3 is an edge view showing the wheel in raised position.
Figure 4:
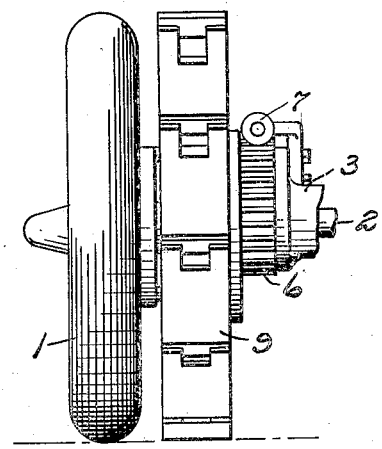
Figure 4 is a similar view with the wheel in lowered position.
Figure 5:
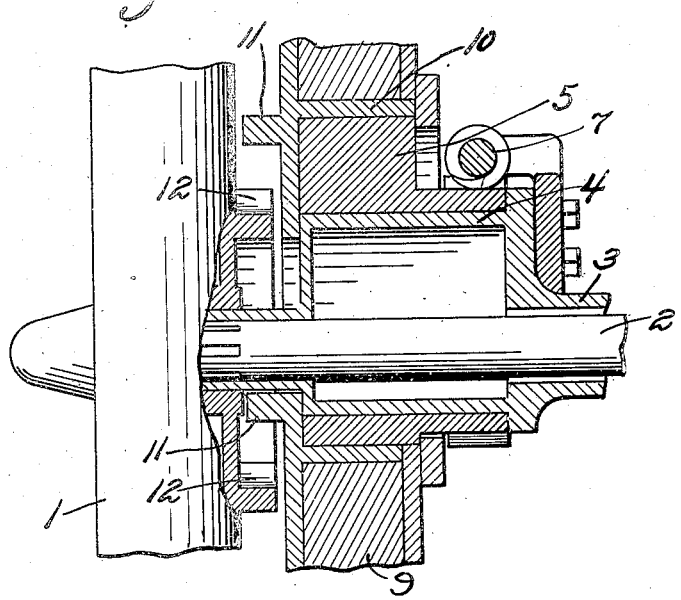
Figure 5 is an enlarged sectional view showing the hub portions with the auxiliary wheel in raised position.
Figure 6:
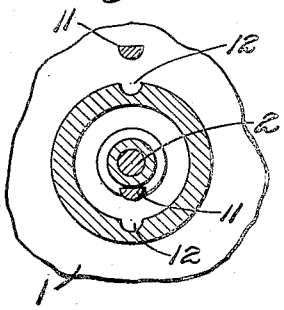
Figure 6 is a section on line 6—6 of Figure 3.

An endless tractor element 14 passes over the auxiliary wheel and over an idler wheel 15 which is carried by a yoke 16 the stem 17 of which is rotatably mounted in a hanger 18 of the vehicle. A spring 19 is arranged on the stem between the hanger and a washer 20 and nut 21 on the stem so that the idler wheel acts as a tensioning device for the chain. While traveling over good roads or hard ground the auxiliary wheel is kept in raised position, as shown in Figures 1 and 3 so that the tractor element will not engage the ground and the auxiliary wheel will not revolve. When the main wheel begins to slip due to soft ground or for other reasons the operator moves the eccentric strap so as to lower the auxiliary wheel and lock it to the main wheel so that the endless tractor element will engage the ground and will be actuated by the revolving auxiliary wheel so as to provide additional traction and thus prevent the vehicle from being stalled. The mounting of the idler wheel permits this movement of the auxiliary wheel without interference on the part of the endless chain and it also acts to keep the chain tight.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In a vehicle, a main wheel and an auxiliary wheel, means for moving the auxiliary wheel vertically to cause it to engage and disengage the ground and means for locking the auxiliary wheel to the main wheel when the auxiliary wheel is in lowered position.

2. In a vehicle, a main wheel and an auxiliary wheel, means for moving the auxiliary wheel vertically to cause it to engage and disengage the ground, means for locking the auxiliary wheel to the main wheel when the auxiliary wheel is in lowered position and an endless tractor element passing over the auxiliary wheel and an idler for said element.

3. In a vehicle, a main wheel and an auxiliary wheel, means for moving the auxiliary wheel vertically to cause it to engage and disengage the ground, means for locking the auxiliary wheel to the main wheel when the auxiliary wheel is in lowered position, an endless tractor element passing over the auxiliary wheel, an idler for said element and means for applying spring tension to the idler and permitting it to have rocking movement.

4. In a vehicle, a main wheel and an auxiliary wheel, an eccentric bearing for the auxiliary wheel, an eccentric strap engaging the bearing and the hub of the auxiliary wheel and means for moving the strap.

5. In a vehicle, a main wheel and an auxiliary wheel, an eccentric bearing for the auxiliary wheel, an eccentric strap engaging the bearing and the hub of the auxiliary wheel, means for moving the strap and means for locking the two wheels together when the auxiliary wheel is moved to its lowered position.

6. In a vehicle, a main wheel, a shaft therefore, an eccentric bearing on the shaft, an eccentric strap on the bearing, an auxiliary wheel having its hub engaging the strap, means for locking the two wheels together when the auxiliary wheel has been lowered, an endless tractor element passing over the auxiliary wheel, an idler wheel for the tractor element, a rotatably mounted frame for said idler wheel and spring means connected with the frame for applying tension to the tractor element.

In testimony whereof I affix my signature.

DABNEY P. OWENS.